Dec. 19, 1939.  D. C. STOCKBARGER ET AL  2,184,162

APPARATUS FOR MEASURING AREA

Filed June 23, 1937   7 Sheets-Sheet 1

Donald C. Stockbarger,
John L. Jones,
Inventors,
Delor G. Haynes,
Attorney.

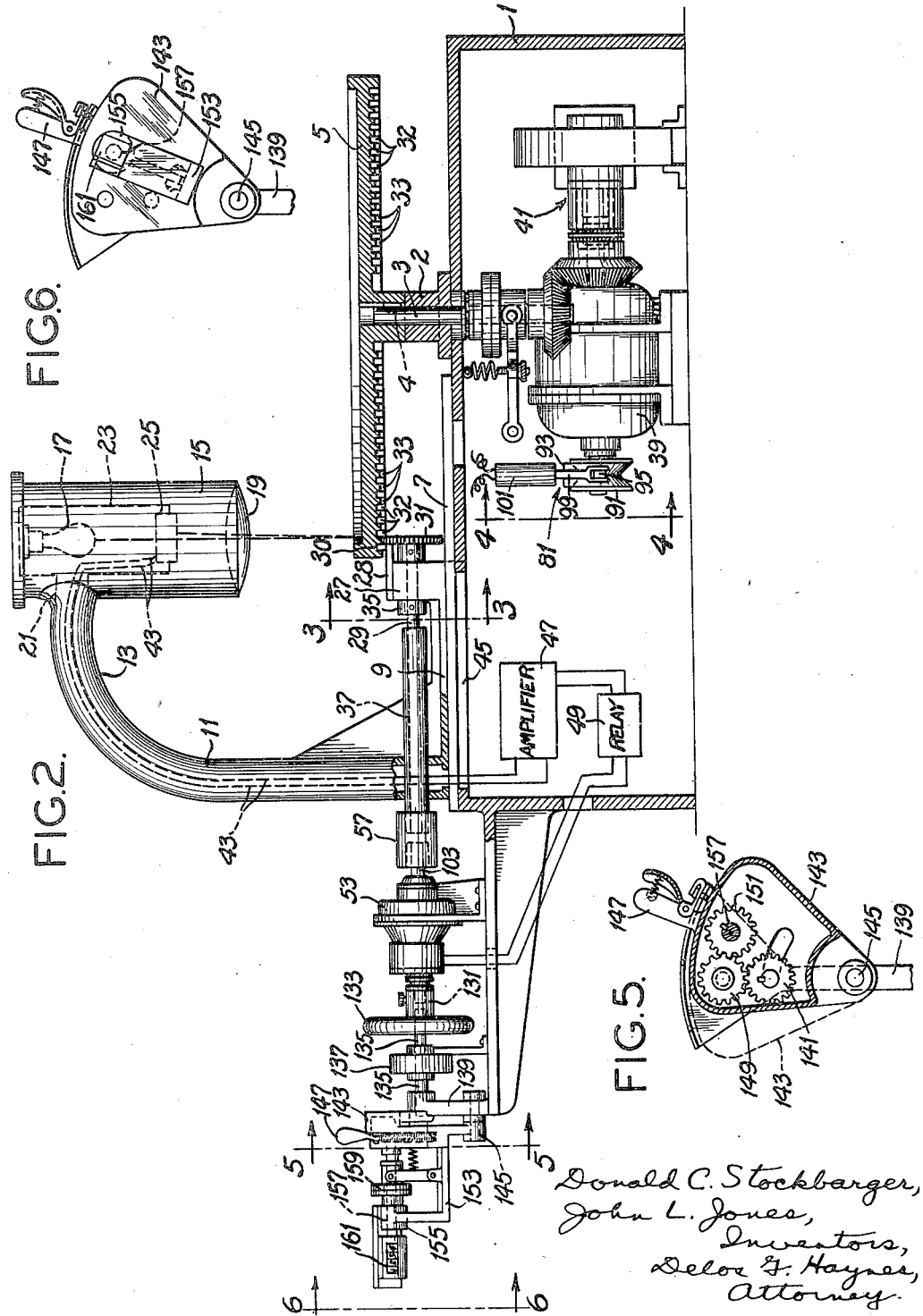

Dec. 19, 1939.  D. C. STOCKBARGER ET AL  2,184,162

APPARATUS FOR MEASURING AREA

Filed June 23, 1937  7 Sheets-Sheet 3

Donald C. Stockbarger,
John L. Jones,
Inventors,
Delos F. Haynes,
Attorney.

Dec. 19, 1939.  D. C. STOCKBARGER ET AL  2,184,162
APPARATUS FOR MEASURING AREA
Filed June 23, 1937  7 Sheets-Sheet 4

Donald C. Stockbarger,
John L. Jones,
Inventors,
Deloz F. Haynes,
Attorney.

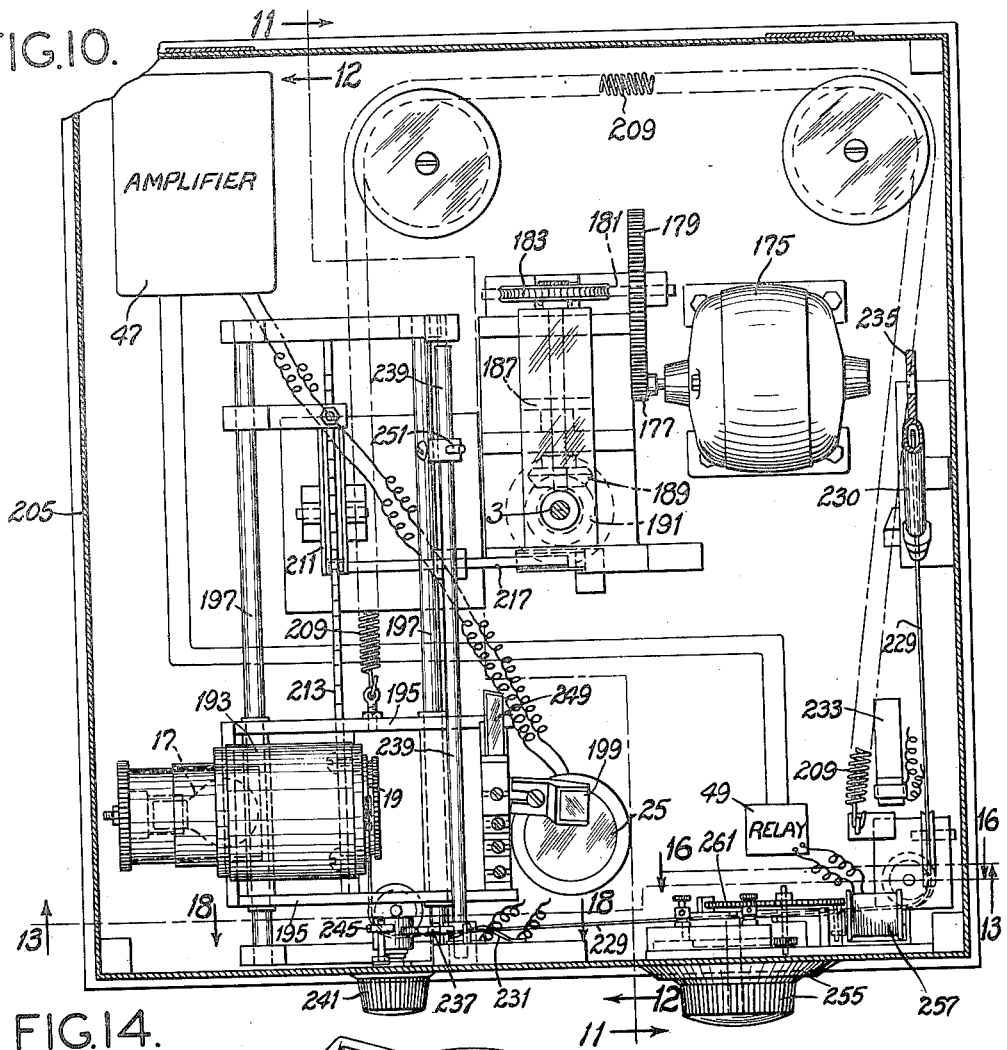

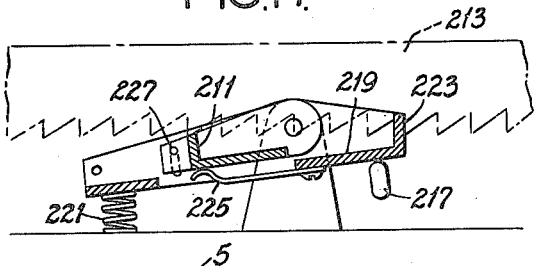
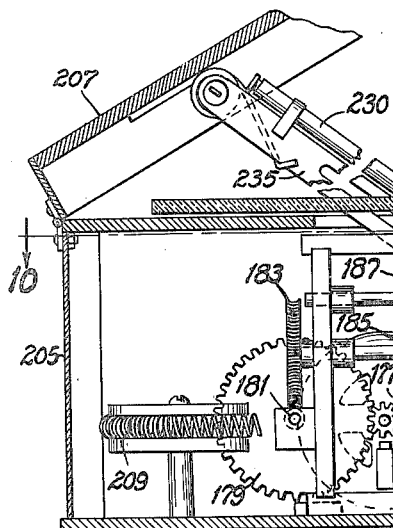
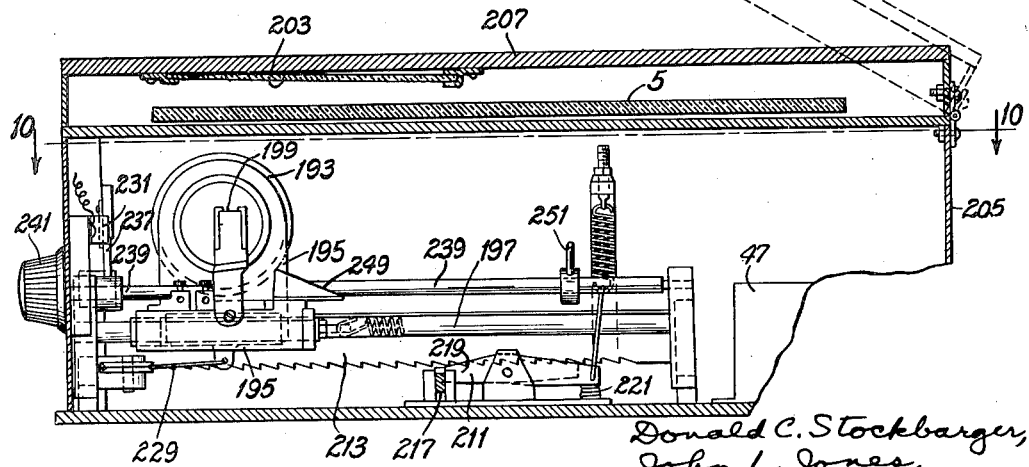

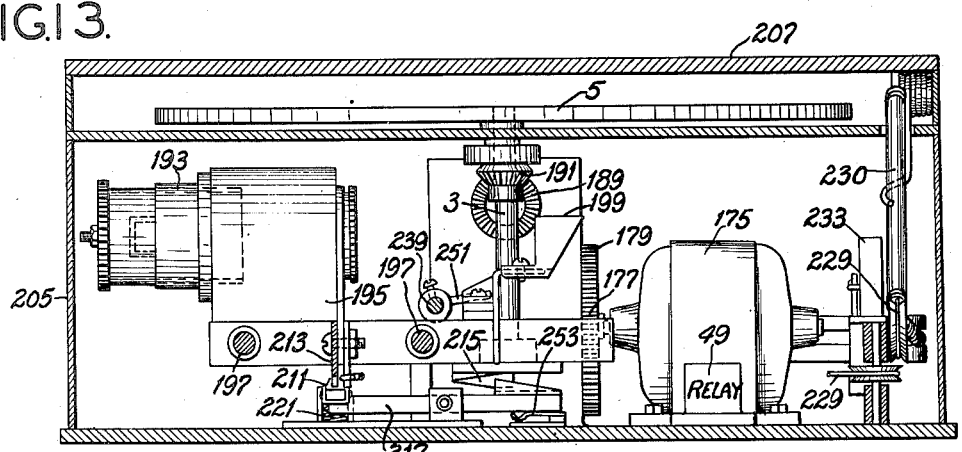
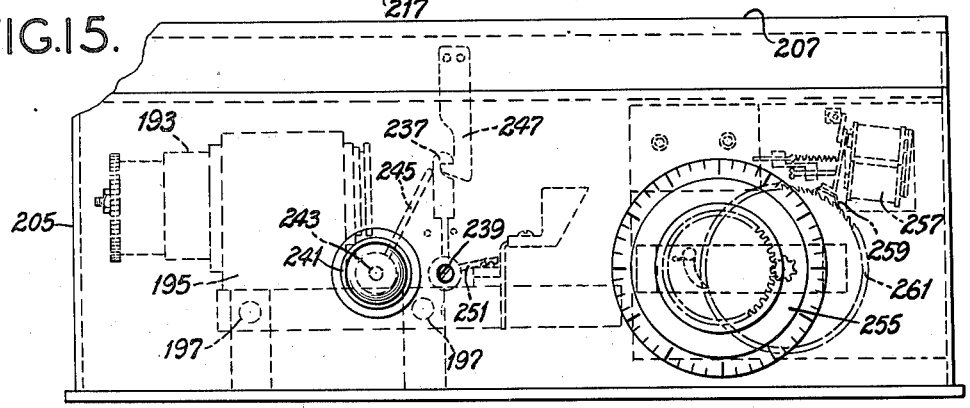
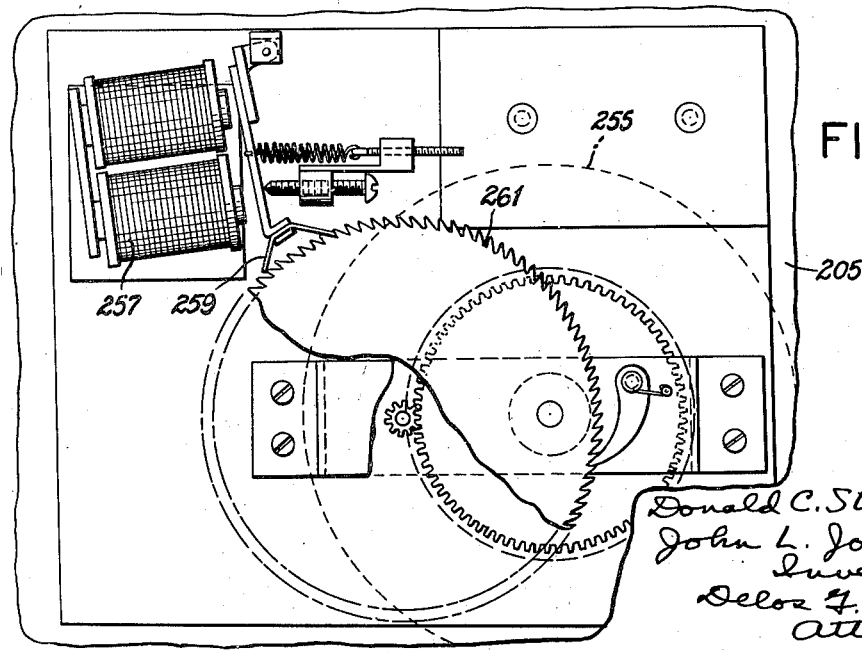

Patented Dec. 19, 1939

2,184,162

UNITED STATES PATENT OFFICE 2,184,162

APPARATUS FOR MEASURING AREA

Donald C. Stockbarger, Belmont, and John L. Jones, North Billerica, Mass., assignors to Stockton Profile Gauge Corporation, Lowell, Mass., a corporation of Massachusetts Application June 23, 1937, Serial No. 149,810

19 Claims. (Cl. 33—123)

This invention relates to the measurement of area, and with regard to certain more specific features, to apparatus for measuring area by the use of light-sensitive devices.

Among the several objects of the invention may be noted the provision of apparatus for measuring area wherein relative movement is effected between a beam of light and a surface to be measured, which surface is superposed on a surface of a different optical character, so that a photosensitive device will be actuated in accordance with the interception or non-interception of the light beam by the said surface to be measured; the provision of apparatus of the class described wherein the path traced by the beam of light on the surface to be measured is a continuous or discontinuous spiral-type path; the provision of apparatus for measuring area in the manner described, in which a light source is provided, and in which means are provided for moving the surface to be measured relative to said light source in such a manner that a beam of light projected from the light source traces a continuous or discontinuous spiral-type path on the surface to be measured; the provision of apparatus of the class described which is relatively compact and which occupies but a minimum of space, relative to the size of the surface the area of which is to be measured; the provision of apparatus of the class described which is adapted to measure, with a relatively high degree of accuracy, work pieces of relatively small total area; and the provision of apparatus of the class described which is relatively simple and economical. Other objects will be in part obvious and in part pointed out hereinafter.

The invention accordingly comprises the elements and combinations of elements, features of construction, and arrangements of parts, which will be exemplified in the structures hereinafter described, and the scope of the application of which will be indicated in the following claims.

In the accompanying drawings, in which are illustrated several of various possible embodiments of the invention, Fig. 1 is a top plan view of area measuring apparatus embodying the present invention;

Fig. 2 is a front elevation of the apparatus of Fig. 1, certain parts being shown in section;

Figures 3, 4, 5 and 6 are vertical cross sections taken substantially along lines 3—3, 4—4, 5—5, and 6—6 of Fig. 2;

Fig. 10 is a horizontal cross-section of the Fig. 9 embodiment, taken substantially along lines 10—10 of Figures 11 and 12;

Figure 9:
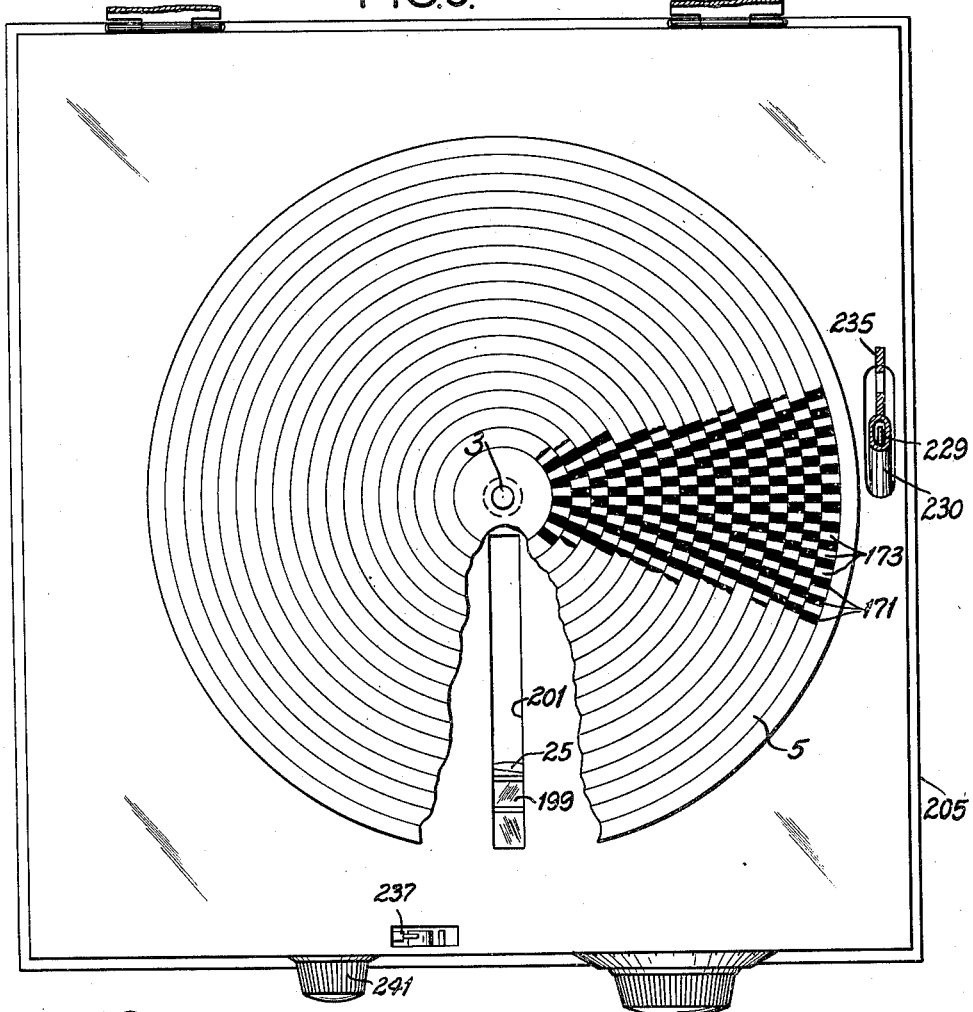
Fig. 9 is a top plan view of a second embodiment of the invention, certain parts being broken away for clarity.
Figure 18:
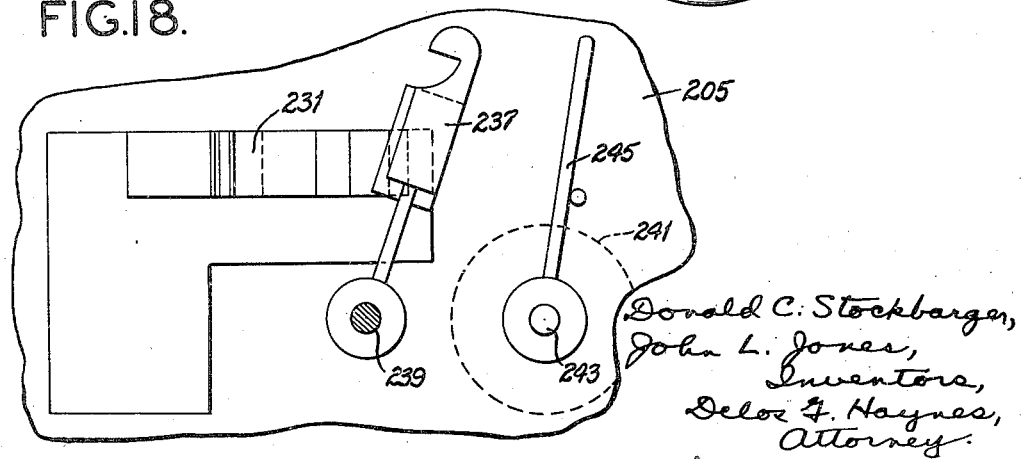

Figures 11, 12 and 13 are vertical cross-sections, taken substantially along lines 11—11, 12—12, and 13—13 of Fig. 10;

Fig. 14 is a perspective view of parts of the scanning mechanism of the Fig. 9 embodiment;

Fig. 15 is a front elevation of the apparatus shown in Fig. 9;

Fig. 16 is an enlarged cross-section taken substantially along line 16—16 of Fig. 10;

Fig. 17 is an elevation of a pawl device; and,

Fig. 18 is an enlarged cross-section taken substantially along line 18—18 of Fig. 10.

Similar reference characters indicate corresponding parts throughout the several views of the drawings.

Since an important commercial use of the invention is in the measurement of leather, tanned skins, and the like, the invention is here disclosed as embodied in machines adapted more especially for this purpose. The machines illustrated are designed to practice a method which may be described briefly as involving the steps of relatively moving a beam of light, or other radiation to which a suitable radiation detector is responsive, across a known area, in which the work piece to be measured is interposed, in such a manner as to scan increments of said area, and detecting and indicating or recording the number of such increments of area which are either covered or uncovered by said work piece. The method thus determines the area of the work piece directly or gives information from which such determination can readily be made.

It will be observed that in this method the area to be measured, or the known area in which the surface to be measured is interposed, may be considered as divided into a multitude of increments of area arranged in an orderly fashion convenient for scanning. In the case of the known area above referred to, the scanning operation detects the presence of those increments not covered by the work, and these increments are counted. Since the function of the scanning beam here is to determine whether successive increments are or are not covered, it obviously is not essential that the scanning beam cover the entire area of each increment.

Assuming, for example, that these increments of area are represented by the spaces in polar coordinate paper, the beam width may be made equal to the width of a row of these spaces and may sweep around the entire row, but it will perform essentially the same functions if it is considerably smaller than the width of such a row and sweeps around the center line of the row. In either event the beam will "scan" successive spaces in the row, and by using a suitable detector with it, it can be made to tell which spaces are covered by the work. The word "scan", therefore, is used herein to include the training of a radiation on a surface for the purposes here described, and the width of the strip whose area is to be determined by the travel of radiation may be greater than the width of the radiation beam.

Although the simple function of determining whether or not a given space is covered by the work piece can be performed in the manner hereinabove set forth using a spot of light which is smaller than the space, a considerable improvement in accuracy may be had by using a beam which substantially uniformly illuminates the entire incremental area, and by using a detector sensitivity such that detection occurs at any instant when the area under the spot is one-half covered by the work piece. That this must be true follows from the consideration that, on the average, partially covered incremental areas may be expected to be half covered. If detection sensitivity were adjusted for nine-tenths incremental area coverage then all incremental areas which were less than nine-tenths covered would not be detected. Similarly, if the detection sensitivity were adjusted for one-tenth incremental area coverage then all incremental areas which were more than one-tenth covered would be detected. Obviously, if incremental areas are on the average half covered an error is to be expected if the detection sensitivity is set too high or too low.

Statistical treatment of any error problem may be used safely only when the number of random items is sufficiently large so that the average value of one series of said items does not differ by more than a predetermined allowable amount from the average value of any other one series of said items. In the scanning of a work piece, or the area surrounding a work piece, the random error of the type which is now under consideration occurs whenever the light spot intercepts the work piece boundary, and the number of such random errors can be made sufficiently large for statistical treatment only by making the incremental areas small so that the light spot intercepts the work piece boundary a great many times during the scanning process. Since there is a practical lower limit to the size of light spot which can be used to scan a work piece in a reasonable length of time, and since the uncertain area bordering a work piece becomes relatively large as the total work piece area decreases and may equal the total area of the work piece in the limit, it is apparent that the maximum possible error should be considered in place of the average error. An area scanning machine is a calculating machine which, like an ordinary adding machine, is used only once for a given measurement and it is necessary for the operator to know within what degree of accuracy any one measurement is made and not how nearly accurate the measurement probably is. It is true, of course, that many of the measurements may be expected to have errors less than the maximum error and that the error in the sum of all of the areas measured over a relatively long period of time may be expected to be less than the maximum possible error in a single area measurement, but the same argument holds for pure guess-work.

The conditions hereinabove set forth for reducing the average error also apply in the reduction of the maximum possible error. If detection occurs when an incremental area is half covered by the work piece, the maximum single error due to boundary uncertainty is one-half of said area whereas if detection occurs when an incremental area is either more or less than half covered by the work piece the maximum single error due to boundary uncertainty is greater than one-half of said area. In the second embodiment of the hereindescribed invention area is measured by the simple counting of transparent spots in a rotating disc which are not covered by a work piece, said transparent spots alternating with opaque spots and the maximum area which the opaque spots cover along the boundary of the work piece must be taken into account in determining the maximum error in a total measurement of area because any portion of the work piece boundary which is covered by said opaque spots is not detected. However, since the undetected boundary area can be made small the corresponding error can likewise be made small.

Figure 1:
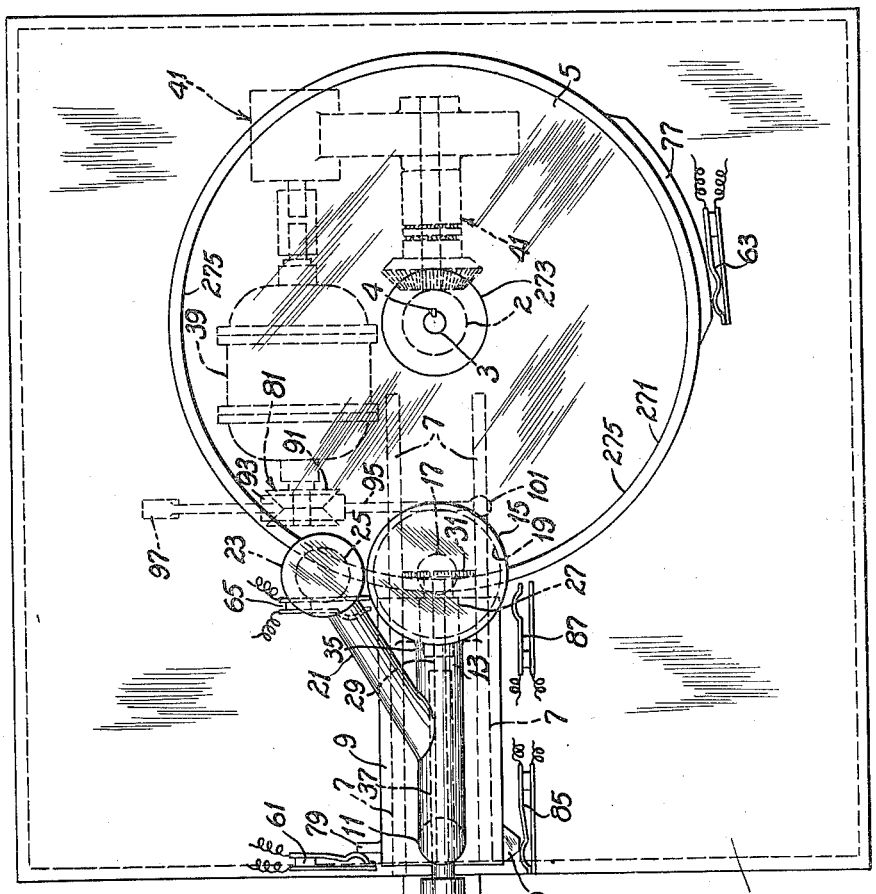

Referring now more particularly to Figures 1 and 2, numeral 1 indicates a base or support which is in the form of a box. A bearing 2, which is mounted on the top of the box 1, serves to support a vertical shaft 3. The shaft 3 is rotatable in the bearing 2. On the upper end of shaft 3 is fixedly mounted, as by a spline 4, a circular work table 5.

Numerals 7 indicate a pair of tracks that are mounted on the top of the box 1. The tracks 7 are parallel to each other, and are placed in such a position that a carriage 9, which slides freely on the tracks 7, moves along a line which intersects the axis of the shaft 3 at a right angle. Supported on the rear part of the carriage 9 is a standard 11, which at its upper end curves forwardly, as indicated by numeral 13, to support a vertical tubular casing 15. Near the upper end of the vertical tubular casing 15 is mounted a lamp 17, which may be of any suitable type, such as an incandescent filament lamp. The lamp 17 will hereinafter be referred to as a scanning lamp. At the lower end of the tubular casing 15 there is provided a condensing lens 19, which is arranged to focus an image of the filament for example of the scanning lamp 17 upon the surface of table 5.

Extending sidewardly from the standard 11—13 is a side arm 21. At its outer extremity, the arm 21 supports a casing 23 which houses a photosensitive device 25. The photosensitive device 25, as hereinafter explained, may be of any suitable type, but is shown, for example, as a so-called "Photronic" cell.

The upper surface of the rotary table 5 is preferably of a specularly reflecting type. For example, it may comprise thin silvered glass, or it may be a highly polished metal, such as aluminum. The disposition of the lamp 17, lens 19, and photosensitive device 25, is such that a beam of light from the lamp 17, focused on the table 5 by the lens 19, is reflected upwardly by the table 5 to the photosensitive device 25. These elements are also disposed in such a manner that as the carriage 9 slides on the track 7, the said beam from the lamp 17 traces a straight line on the plane of table 5, which straight line intersects the axis of rotation of said table 5.

Figure 3:
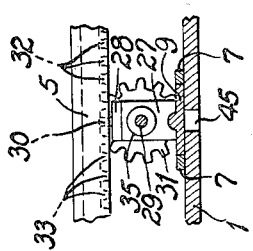

Extending upwardly from the forward end of the carriage 9 is a bearing 27, which rotatably supports a horizontal shaft 29. To the end of the shaft 29 which projects under the table 5 is made fast a pinion 31. The pinion 31 meshes with the teeth of a spiral rack 33 formed on the under side of the table 5. While the shaft 29 is permitted to rotate in the bearing 27, it is prevented from longitudinal movement therein by means of the hub of the pinion 31 on one side and a collar 35 on the other side of said bearing 27. Mounted on top of the bearing 27 is a forwardly-projecting plate 28, the forward end of which carries an upwardly-projecting pin 30 (see also Fig. 3) which engages the spiral groove 32 that separates the successive turns of spiral rack 33.

The other end of shaft 29 telescopes within a hollow shaft 37. The shaft 29 is either splined to the hollow shaft 37, or the telescoping portion of the shaft 29 is provided with a polygonal cross section which fits into a complementary polygonal cross section in the hollow shaft 37, in order that the shaft 29 constitutes a positive drive for the shaft 37. The shaft 29 is driven by the table 5 through the spiral rack 33 and the pinion 31 and the shaft 37 drives the electrically controlled integrating mechanism to be described hereinafter. The table 5 is driven positively on its shaft 3 by a motor 39 acting through suitable connections, such as the gear train indicated by numeral 41. The pin 30 engaging groove 32 provides a drive for the carriage 9 and also serves to establish the radial position of the pinion 31 relative to the axis of the table 5 and therefore to keep the pinion 31 in position to be driven by the rack 33.

From the foregoing description it will be seen that as the motor 39 drives the table 5 the pinion 31 and the carriage 9 move radially inwardly or outwardly relative to the table 5, depending on the direction of rotation of the motor 39, within the limits set by the ends of the rack 33. Thus the driving connections are such that the motor 39 not only revolves the table 5 but it also gives to the scanning beam its desired traversing movement across the table 5 and it gives the coextensively rotating shafts 29 and 37 their desired rotary motion. It will also be seen that the speed of rotation of the shaft 37 is proportional to the linear speed of the rack 33 where said rack drives the pinion 31. In order to insure that the connection between the rack 33 and the pinion 31 is along the center line of the rack 33 and to facilitate meshing of the teeth of the pinion 31 with the teeth of the rack 33 both the pinion 31 and the rack 33 are made narrow and may be made much narrower than has been indicated for convenience in Figures 1 and 2. The optical system of the light source consisting of the lamp 17 and the lens 19 are adjusted so that the scanning beam is intercepted by the table 5, or by a work piece laid thereon, at a point immediately above the point of driving connection between the rack 33 and the pinion 31, and therefore the shaft 37 rotates at a speed which is proportional to the linear speed of the motion between the light spot and the table 5, said motion being due in part to the radial motion of the spot and in part to the angular motion of the table 5.

In the operation of this apparatus, the work piece, the area of which it is desired to measure, is centrally positioned on the upper surface of table 5, and the drive is then commenced. It will be seen that the scanning beam produced by the lens 17 will trace a spiral path on the table 5, due to the angular component of motion provided by the rotating table 5 and the radial component provided by the sliding carriage 9. So long as the scanning beam from the lamp 17 is not intercepted by the work piece, it will be reflected to, and actuate, the photosensitive device 25. However, when the work piece intercepts the scanning beam, no light is reflected to the photosensitive device 25 by the surface of table 5 and not enough light is reflected by the work piece to the photosensitive device 25 to actuate it sufficiently to operate mechanism hereinafter to be described. If, accordingly, the periods during which the photosensitive device 25 is or is not actuated can be measured, and correlated with the feed of the work piece during the measured intervals, an expression of the area of the work piece will be obtained.

Figure 7:
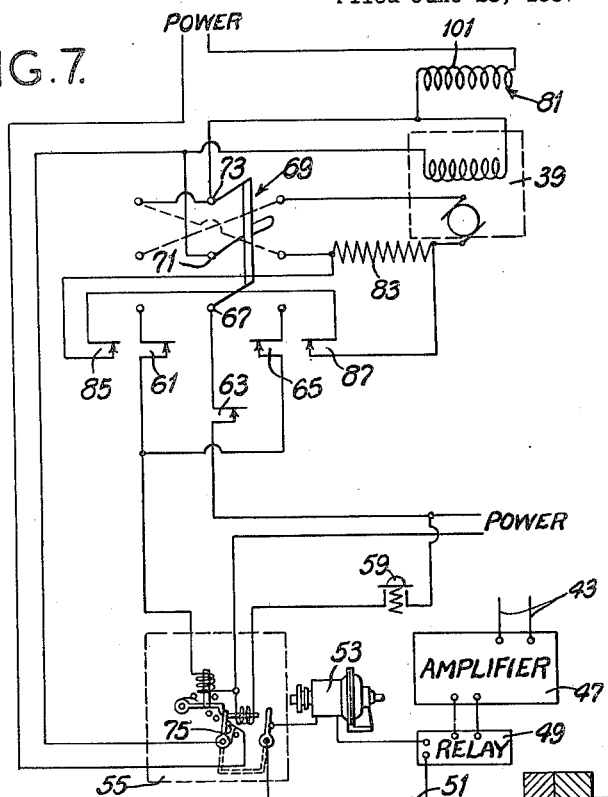
Fig. 7 is an electrical circuit diagram.

Wires 43 are provided which connect the photosensitive device 25, through the arm 21, standard 11, and a slot 45 in the box 1, to an amplifier 47. The nature of the amplifier 47 necessarily depends upon the requirements of different types and designs of machines, the nature of the particular photosensitive device 25 used, and other practical considerations. The output current of the amplifier 47 controls the operation of a relay 49, which may consist of an electromagnetically operated switch. The relay 49 opens and closes a circuit (see Fig. 7) which includes a source of power 51, an electromagnetic clutch 53 and one of two pairs of contacts of an electromagnetically operated switch 55. The switch 55 is provided to open said circuit at a predetermined time when the scanning is completed and thus to prevent the operation of the electromagnetic clutch 53 during any rotation of the shaft 37 after the completion of the scanning. The electromagnetic clutch 53 is driven by the shaft 37 through a coupling 57. The switch 55 is of the remote control double-pole kind which is closed by the operation of a push button 59 and which is opened by the simultaneous closing of two of three switches 61 and 63 or 63 and 65 as indicated in Fig. 7. The electrical connections between switches 61 and 63 and between switches 63 and 65 are made by one pole 67 of a three-pole double-throw switch 69. The remaining two poles 71 and 73 of the switch 69 comprise a reversing switch for the motor 39 as indicated in Fig. 7. The power supply to the motor 39 is controlled by a remaining pole 75 of the electromagnetic switch 55 in such a way that the motor 39 is de-energized at the same time that the electromagnetic clutch 53 circuit is opened by said switch 55. Switches 61, 63 and 65 are of the "jack" type and are mounted on the top of the box 1 as indicated in Fig. 1. Switch 63 is closed by a lug 77 on the periphery of the table 5 once each revolution of the table 5. Switches 61 and 65 are closed by a lug 79 on the carriage 9 and are adjusted in position so that switch 61 is closed during the time that the pinion 31 is in contact with the outermost half turn of the spiral rack 33 and switch 65 is closed during the time that the pinion 31 is in contact with the innermost half turn of the rack 33. Switch 63 is positioned to be struck by the lug 77 on the periphery of the table 5, and therefore closed, precisely at the beginning and at the end of the scanning process as well as once each revolution of the table 5 during the scanning process, but the circuit containing the switch 63 can be closed only at the end of the scanning process because the switches 61 and 65 are closed only for a short interval at the beginning and at the end of the scanning process and the three-pole switch 69 prevents closing the circuit containing the switch 63 at the beginning of the scanning process. The three-pole switch 69 connections are such that after the motor 39 has run in one direction to the limit set by the switches 61 and 63, for example, said switches are rendered collectively inoperative when the connections to the motor 39 are reversed and therefore said switches do not prevent starting the motor 39 in the reverse direction when the push button 59 is operated, and the motor 39 can then run in the reverse direction until stopped by the simultaneous action of the switches 63 and 65 after which the return of the switch 69 to its original position permits the restarting of the motor 39 in its original direction of rotation.

The spiral rack 33 terminates abruptly at the two points on the spiral center line which define the limits of the scanning and which therefore define the beginning and the end of the scanning process. The termination of the rack 33 in the manner described serves to protect the teeth of the rack 33 and of the pinion 31 against stripping during the rapid stopping of the motor 39 by an automatic brake 81 which will be described hereinafter, and it also serves to define precisely the beginning of the scanning process. Stripping of the teeth of the rack 33 and the pinion 31 at the beginning of the scanning process is prevented by slow starting of the motor 39 through the use of a resistance 83 connected in series with the motor 39 armature, said resistance 83 normally being short-circuited by a pair of jack switches 85 and 87 mounted on top of box 1, as shown in Fig. 1, and connected in series so that no matter which jack switch 85 or 87 is operated by a lug 89 on carriage 9 (Fig. 1), sufficient resistance is added to the armature circuit to insure slow starting of the motor 39.

Figure 4:
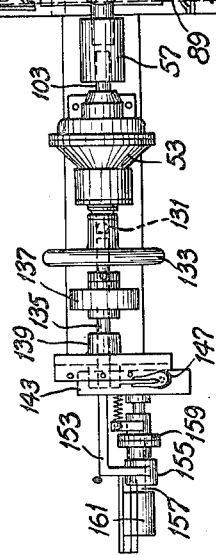

The aforesaid automatic brake 81 comprises a drum 91 (see Figures 1, 2, and 4) on the shaft of the motor 39, and a brake shoe 93 attached to a lever 95 which is supported at one end by a bearing 97 and which carries at the other end a plunger armature 99 which is controlled by a solenoid 101. The solenoid 101 is connected in series with the motor 39 (see Fig. 7) and requires so little current for its operation that the brake is released as soon as the motor 39 circuit is closed by the electromagnetic switch 55 although the motor 39 may be drawing less than normal current. Such an automatic brake as herein described is commonly used in industry and serves to stop a motor positively through the force of gravity on the brake shoe assembly, said force being overcome by the solenoid 101 when electrical power is being supplied to the motor 39.

Figure 8:
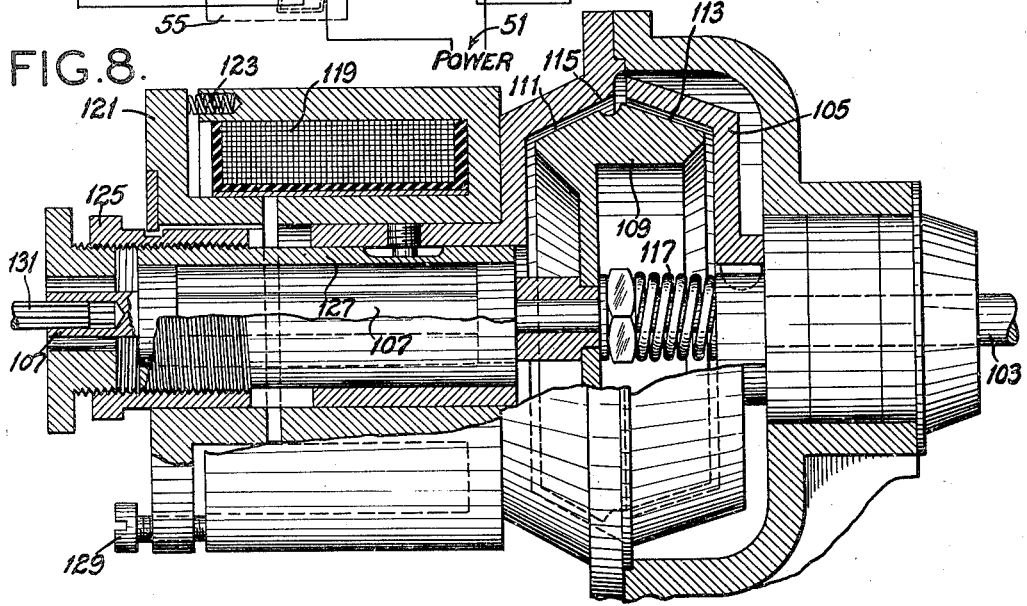
Fig. 8 is a cross-section of a magnetic clutch.

The electromagnetic clutch 53 may be of any suitable type, but a preferred form is shown in Fig. 8. The shaft 37, acting through coupling 51, and a shaft 103 is the drive for this mechanism, and shaft 103 has a driving disc 105 secured fast on it, the shaft 103 being mounted in ball bearings. A driven shaft 107 is also mounted in ball bearings and is supported coaxially with the shaft 103. The driven shaft 107 carries a rotor 109. All of this mechanism is mounted within a stationary housing or casing. The rotor 109 is provided with two conical surfaces 111 and 113, one of which is arranged to engage a complemental surface 115 on the housing and normally is held in contact with it by a spiral spring 117. Thus the surface 115 acts as a brake, and since there is no power tending to drive shaft 107 when it is thus braked, the rotor 109 is held stationary. At one end of the casing is an electromagnet comprising a stationary coil 119 and an armature 121 mounted at the end of said coil and normally held away from it by three coiled springs one of which is shown at numeral 123. The armature 121 has a loose engagement with a sleeve 125 threaded on a bushing 127 in which the ball bearings are mounted for supporting the shaft 107. When coil 119 is energized, it moves armature 121 to the right, and this movement produces a corresponding movement of the bushing 127 to the right together with the bearings mounted therein, the shaft 107, and the rotor 109. Adjusting screws, one of which is shown at numeral 129, serve to limit the extent of this movement, and it is made of such an amplitude that the conical surface 113 of rotor 109 engages the complemental surface of driven disc 105 and establishes a driving connection between shafts 103 and 107. This continues until the winding 119 is de-energized, at which time the spring 117 immediately moves rotor 109 to the left into contact with braking surface 115, thus stopping almost instantly the rotation of shaft 107. The shaft 107 is in fact hollow, and slidably carries an inner shaft 131 therein. The shafts 107 and 131 are splined together, so that their rotation is coextensive. Shaft 107 is required to move longitudinally with the movements of the clutch, but shaft 131 is longitudinally stationary.

Shaft 131 engages one side of a manually operable disconnecting device 133 (Figures 1 and 2), the other side of which receives a shaft 135 coaxial with shaft 131. The device 133 optionally connects shafts 131 and 135 together, for rotation, or disconnects them so that shaft 135 can be rotated independently of shaft 131. Shaft 135 connects, through a speed-change gear box 137 and bearing 139, to a driving gear 141 (see also Figures 5 and 6) of a reversing gear train device 143. Device 143 comprises a sector-shaped box which is pivoted on a stud 145 mounted on bearing 139 and which is provided, on its upper surface, with a locking handle 147. Two meshing gears 149 and 151 are mounted in box 143, and the gears 149 and 151 are both positioned so that they can alternately mesh with gear 141 as the box 143 is rotated on stud 145.

When the box 143 is in its full-line, Fig. 5 position, gear 141 meshes with gear 149 which is meshed with gear 151. Gears 141 and 151 thus rotate in the same direction. When the handle 147 is manipulated so that box 143 is in its dotted-line, Fig. 5 position, however, gear 141 meshes with gear 151 directly, and gear 151 thus rotates in an opposite direction to gear 141.

Numeral 153 (Figures 2 and 6) indicates a bracket that is mounted on the far side of box 143. Bracket 153 supports a bearing 155, which in turn receives a shaft 157 that extends into box 143 and has gear 151 non-rotatably mounted thereon. A friction brake 159 acts on shaft 157 at all times, so that it rotates only at such times as it is positively driven by gear 151. The far end of shaft 157 is coupled to a revolution counter 161 of customary construction.

To yield ever-increasing values, the revolution counter 161 must always be driven in the same direction. But, as will be explained hereinafter, shaft 37 (and hence shaft 135) does not always rotate in the same direction for each measurement. It is the function of the reversing gear train 143 to provide for uniform rotation direction of shaft 157 and hence counter 161 regardless of the direction of rotation of shaft 37.

The disconnecting device 133 permits freeing the shaft 135 from shaft 131 (and hence shaft 37) long enough to reset the counter 161, if this is necessary.

The brake 159 is provided for preventing errors in the reading of counter 161 due to any backlash which may develop in multiplier gear 137 or the reversing gear train 143. The brake 159 can be adjusted to give any desired light braking action.

The operation of the integrating mechanism will next be described. When the machine is in operation and a work piece is carried by the rotating table 5, as heretofore described, the action of the light on the photosensitive device 25 will cause power sufficient to actuate the relay 49 to be delivered by the amplifier 47 so long as the scanning beam is not intercepted by the work piece. Assuming that the relay 49 holds open the circuit through the electromagnetic clutch 53 at this time the electromagnetic clutch 53 will not be energized and there will be no driving connection between the shaft 37 and the reversing train 143 and therefore the counter 161 will not be operated. As soon, however, as the scanning beam is intercepted by the work piece, and is therefore prevented from reaching the photosensitive device 25, the amplifier output power will be cut down to a value so low that the relay 49 will close the circuit through the electromagnetic clutch 53. Thereupon the reversing train 143 will be driven by the shaft 37 through the electromagnetic clutch 53, the handle 147 being in position to give the counter 161 the desired direction of rotation. As long as the electromagnetic clutch 53 remains energized the counter 161 will be driven at a speed proportional to the speed of the scanning which is the linear speed of the scanning beam spot across the surface of the work piece, and therefore the counter 161 will measure the area of the work piece scanned.

It will thus be evident that in this arrangement known increments of area are scanned in relative intervals of time, and consequently, each such time interval represents a definite area. The counter 161 counts and thus collects or integrates, the increments of area or the relative time intervals during which the scanning beam is intercepted by the work piece being measured; and it may be calibrated to give the result directly in square feet, or in some other convenient unit of square measure. If, however, the relay 49 is made to operate in a manner reverse to that just described, then the counter will integrate the area increments not covered by the work piece or realtive time intervals during which the scanning beam is not intercepted by the work piece. By subtracting this result from the known area of the table 5, on which the work piece is interposed, or the total relative time required for the beam to traverse said area, the same result will be obtained as before. In either case the counter gives a result which bears a definite relation to the area of the work piece being measured, and from that result the area in square feet, or other convenient unit of square measure, can easily be determined. Whichever method is used, the outer boundary of the scanned area must include the entire work piece, and if there is a "dead spot" or unscanned region on the table, said region must be treated in a manner hereinafter set forth.

If the machine shown in Figures 1 and 2 is to be used where stray light is likely to affect the result, it may be enclosed in a suitable casing for operation.

In the machine shown in Figures 1 and 2, the scanning operation proceeds in a continuous spiral path. Another machine of the polar integrator type is illustrated in Figures 9 to 17, inclusive, in which the scanning operation proceeds in concentric circles, the scanning beam being stepped from one circular path to another as each circular path is completed. While this is not, mathematically speaking, a "spiral" path, still it will be seen that it closely approximates a discontinuous spiral. For the purposes of this application, therefore, the terms "spiral-type path" are used as inclusive of both the scanned path of the Fig. 1 embodiment and the scanned path of the Fig. 9 embodiment.

The construction of the Fig. 9 embodiment also differs from that previously described in that the turn table 5 is of a checkerboard type. That is, each circular scanning path is divided into alternating black and white sections 171 and 173, respectively, each pair of sections constituting a convenient unit of area, say a tenth or a hundredth of a square inch. During the measuring operation those units not covered by the work piece are counted, and the area of the work piece is obtained by a subtraction method which will be described in detail hereinafter.

In this particular machine the table 5 is made of glass or other transparent material, and the black or opaque sections of the checker units alternate with clear or transparent sections. It is not necessary, however, that the opaque sections be equal in size, or that they be sectors of the annulus in which they lie or cover the entire width of the scanned annulus, it merely being essential that the black or opaque areas have sufficient extent in each section to insure detection. In this machine the beam is maintained in a stationary position while the table makes one revolution. It then is shifted toward the axis of rotation of the table a distance substantially equal to the width of the scanned annulus. A motor 175 drives the table through suitable reduction gearing, comprising, for example, a pinion 177 on the motor shaft, a gear 179 driven by pinion 177, a worm 181 on the shaft of the gear 179, a worm wheel 183 driven by worm 181, a pinion 185 on the shaft of worm wheel 183, a gear 187 driven by pinion 185, a bevel gear 189 on the shaft of gear 187, and a bevel gear 191 on the shaft 3 of table 5 driven by bevel gear 189 (see Fig. 11). A lamp tube 193 in which the scanning lamp 17 and lens 19 are mounted and the photosensitive device 25 are all secured to and carried by a carriage 195, supported for sliding movement on a track consisting of two parallel horizontal rods 197. Also secured on this carriage is a reflecting prism 199 (see also Fig. 14) which reflects the scanning beam upward through a slot 201, Fig. 9, in the casing to a mirror 203 (Fig. 12) located above said slot and table. All of these parts are supported in a box or casing 205, and the mirror just mentioned is secured to the lower side of a hinged cover 207 for the box. It reflects the beam down through the table 5 and slot 201 on to the photosensitive device 25.

The scanning beam is moved radially of the table as the scanning operation progresses, but the carriage 195 is located some distance from the plane of movement of the beam. The carriage feeding mechanism comprises a coiled spring 209, tending constantly to move the beam inwardly toward the axis of rotation of the table, while a spring pressed pawl 211, Fig. 12, engages the teeth of a rack 213 secured to said carriage and normally holds the carriage in a stationary position. At each rotation of the table a lug 215, Fig. 13, on a cam secured to the table shaft 3, engages one end of a lever 217 and depresses it, thus lifting the opposite end of this lever which underlies one end of a rocker 219 within which the pawl 211 is mounted. Normally the left-hand end, Fig. 17, of this rocker 219 is held up by a spring 221 (Fig. 17), but the movement of the lever 217 lowers it far enough to trip the pawl 211, a supplemental pawl 223 first being raised into engagement with the rack 213 and permitting only a very slight forward movement of the carriage. As soon as the cam lug 215 has passed out of engagement with the lever 217 it releases the rocker 219, whereupon the spring 221 again raises the left-hand end of the rocker 219 and, with it, the pawl 211. The two pawls 211 and 223 are so spaced that the former strikes the tip of the tooth that it formerly engaged, as shown in Fig. 17, and when the pawl 223 moves down far enough to disengage the tooth, the rack 213 and the carriage 195 slide forward until the next tooth is caught and held by the pawl 211. Thus the carriage is advanced one tooth only in each rotation of the table. The pawl 211 and the rocker 219 are pivoted on the same axis, but the pawl 211 normally is held upwardly with reference to the rocker by a leaf spring 225 (Fig. 17). It is lowered by pins 227 projecting laterally from it into slots in the sides of the rocker 219 when the lever 217 raises the rocker.

In this machine the cover 207 should be kept closed when the measuring operation is being performed since otherwise the mirror 203 will not be in its operative position. At the completion of this operation the motor is automatically stopped, as presently to be described, and the cover may then be raised to remove the work. This cover lifting operation is also used to return the carriage 195 to its initial position in readiness to repeat the scanning operation. For this purpose a cord or flexible wire 229 is secured at one end to the cover 207 by a tensioning device 230, as indicated in Figures 10, 11, and 13, and runs over suitable rolls to the carriage 195 where its opposite end is fastened, the arrangement being such that the result just described is produced.

Means are desirably provided for locking the cover in its closed position and preventing either the opening of the cover until the measuring operation has been completed, or the starting of this operation until after the cover has been closed. To this end the supply of current for both the motor 175 and the scanning lamp 17 is led through a manually operated switch 231 (Figures 10 and 12) and a second switch 233 (Figures 10 and 11) in series with the first switch. Both of these switches are of the spring contact variety and are normally open. The spring contact of the latter switch, however, is in the path of movement of a bar 235, operated by the cover, so that this switch is always held open until the cover has been closed, but thereafter is held closed. The other switch 231 also is normally open, but it lies in the path of a hook 237 (Figures 12, 15 and 18) secured on a rock shaft 239. A control knob 241 is mounted on the end of a shaft 243, which projects through the front wall of the casing 205, and the shaft 243 has an arm 245 projecting laterally from it inside the casing and located immediately behind the hook 237. The arrangement is such that when the knob is turned toward the right, Fig. 15, the arm 245 engages the hook 237 and throws it toward the right, far enough to cause it to close the switch 231. This movement also causes the hook 237 to engage a cooperating hook 247, Fig. 15, projecting downwardly from the cover 207, thus locking the cover closed. At this time, therefore, the casing is locked and the current is turned on to the motor 175 and the scanning lamp 17.

Just before the carriage 195 arrives at the inner limit of its movement, a cam 249, Fig. 10, fast on the carriage 95, engages an arm 251 which is secured rigidly to and projects laterally from the rock shaft 239 and lifts this arm 251 far enough to swing the rock shaft 239 back sufficiently to release the hook 247, thus unlocking the cover 207. Simultaneously the switch 231 is opened, thus shutting off the current to the motor 175 and to the scanning lamp 17. With this arrangement, therefore, it is impossible to start the machine until after the cover 207 has been closed and locked, and it is also impossible to open the cover 207 until the scanning has been completed.

In order to guard against the possibility of something going wrong with the machine which will make it necessary to get into the casing after the cover has been locked, it is desirable either to slot one end of the shaft 239 shown in Fig. 15 so that it will take a screw driver, or else to make some other provision for enabling the superintendent, or a person in authority, to unlock the cover. This can readily be done by making the unlocking means of such a nature that it will take a key or special tool with which the ordinary operator will not be equipped, or making any equivalent provision to prevent the operation of the lock or of the switches by any one other than a person in authority.

The operation of the arm 217 by the cam lug 215, as above described, occurs near the end of the in-feeding movement of the carriage. In order to prevent the motor 175 from being stopped by the opening of either of the switches 231 or 233 until after the cam lug 215 has moved off the lever 217, a switch 253, Fig. 13, is arranged to be held closed by the arm 217 so long as the latter is depressed by the cam. This switch 253 short-circuits the switches 231 and 233 and when it is closed it will hold current on the motor 175 notwithstanding the fact that one or both of the switches 231 or 233 may have been opened.

These polar integrator types of machines lend themselves readily to the determination of the area measurement by either the subtraction or addition methods. Since they are designed primarily to measure the areas of opaque work pieces, use may be made of their natural surface reflection characteristics. If a work piece specularly reflects a relatively small fraction of the incident scanning beam whereas a mirror located back of it specularly reflects about nine-tenths of the beam, a photosensitive device placed in the path of the reflected beam responds less when the mirror is covered by the work piece. If, however, a work piece specularly reflects a relatively large fraction of the incident scanning beam whereas a dull black surface located back of it specularly reflects a small fraction of the beam, a photosensitive device placed in the path of the reflected beam responds more when the black surface is covered by the work piece. Since in practice simple adjustments insure that response of the integrator control system occurs only when a predetermined fraction of the scanning beam is incident on the photosensitive device, neither total reflection nor complete absence of reflection is necessary.

As shown in Fig. 9, the checkered area is divided into contiguous annular strips. The sequence of strips may terminate at the axis of the disc or at any convenient distance therefrom without affecting the accuracy of the machine. In the latter case there remains a known unscanned region which must be covered by the work piece entirely or not at all. If this spot is uncovered, its area is not taken into account. If it is covered, a definite correction is applied to the observed area when the addition method is used or to the total scanned area when the subtraction method is used.

To explain the two methods of area determination the following procedure outlines are given. In both cases a machine having a small unscanned central region is assumed since on account of its greater mechanical simplicity it is cheaper to build. It is assumed that the work piece has a surface whose specular reflecting power is relatively low. When the cover 207 is raised to the limit of motion, the work piece is placed on the table 5 in such a position that the central unscanned region is entirely covered and no part of the work piece lies outside the boundary of the checkered area. The cover then is closed and a dial 255 (to be described) is set. When the switch 231 is closed the table 5 begins to turn and after it has made about one revolution the carriage 195 jumps to the initial scanning position. Simultaneously the dial 255 begins to register the number of transparent spots or area units in the first annular strip which are not covered by the work piece. When the table 5 has completed this revolution the carriage 195 jumps to position for scanning the second annular strip and so on, the counting of the number of uncovered transparent spots continuing without interruption until the carriage 195 has travelled to the limit of its motion. In the embodiment shown in Figures 9 to 18, the area of the work piece is found, for example, by subtracting the total number of uncovered spots from 1000 since each represents an area of one-tenth of a square inch and the total area of the checkered strips and the central unscanned region is 100 square inches. This subtraction is performed automatically by setting the dial 255 at 100 initially and driving it backwards. The counting arrangement, as shown in Fig. 16, comprises an electromagnet 257, arranged to be operated through the relay 49 by the impulses produced in the circuit of the amplifier 47 of the photosensitive device 25 by the interruption of the beam at each uncovered checker unit, and it operates a pawl 259 which advances a ratchet wheel 261 one tooth on the return movement of the pawl 159 for each unit area or spot so counted. This ratchet wheel 261 is connected through reduction gearing to the dial 255, which is graduated in square inches and decimals thereof. If, for example, the work area is 60 square inches, 400 transparent spots are uncovered. Therefore, during the scanning operation the dial 255 is turned back 400 divisions and reads finally 600, which is the area expressed in tenths of a square inch. Because the area is obtained by subtracting the uncovered area from the total working area of the disc, we call this the subtraction method. The operations are the same when the central unscanned region is uncovered. In this case, however, the total working area is 1000 units minus the unscanned area. If, for example, the unscanned central area is 100 units, the dial is set initially at 900.

This same machine can be used to measure the area of a highly reflecting piece of work such as a sheet of polished aluminum. To do this the mirror 203 on the under side of the lid 207 is removed or covered with any convenient material having a low specular reflecting power. Otherwise the operations are the same as described for measuring the area of a relatively poorly reflecting piece of work. In this case, however, all covered transparent spots are counted, the scanning beam being reflected back by the work piece. Therefore the dial 255 is driven in the forward direction and the work piece area is the sum of the areas represented by the covered spots plus the area of the unscanned central region. This summation is performed automatically by setting the dial 255 initially at a mark representing the unscanned area. For example, if the work piece area is 50 square inches and the unscanned area is 1 square inch, 490 transparent spots are covered. The initial dial setting is 10 and the final reading is 500. Because the area is obtained by adding the elements of area which together constitute the whole, we call this the addition method. The operations are the same when the central unscanned region is uncovered. In this case, however, no correction is made for the unscanned area and therefore the dial is set initially at zero.

Although the spiral-type of polar integrator, Figures 1 and 2, makes area determinations based on relative lengths of time instead of numbers of spots, the corrections for the central unscanned area are made in the same manner as outlined above for the checkered disc polar integrator. Either the addition or the subtraction method can be used in measurements made with the spiral-type of machine regardless of the reflection characteristics of the work surface. Work having a relatively low specular reflecting power is placed directly on the polished metal table or disc, whereas a sheet of dull black material is interposed if the work has a relatively high specular reflecting power. In addition to these conditions the electrical connections between the counterclutch and relay determine whether the addition or subtraction method is used.

Regardless of the type of machine, when the subtraction method is employed it is essential that the scanning be complete and definitely limited. When the addition method is employed the scanning must include all area elements on the surface of the work piece which do not lie over the central unscanned region. Provision for automatic starting and stopping of the scanning has been provided in both embodiments in order to ensure the necessary and complete scanning.

For convenience in enabling the operator to see exactly what the scanning limits are in the first embodiment, circles 271 and 273, Fig. 1, may be scribed on the table 5 to indicate these limits. In addition, the outer margin of the table may be raised, as shown in Fig. 2, and separated from the main body of the table by a circumferential shoulder 275 corresponding in position to the outer circle 271, in order to make this limit more positive. Thus the working area of the table, when the central unscanned portion is to be used, is the entire area within the circle 271. If, however, the area within the circle 273 is not to be used, then the working area consists of the annulus between this circle 273 and the circle 271. The work may be held against slipping on the surface of the table 5 by weighting, or if the work is sheet material, by placing a transparent glass plate of suitable weight upon it.

It may here be pointed out that the photocells are essentially electrical detectors of radiation. Various such detectors are known in addition to those specifically mentioned above, such for example, as bolometers, Photronic cells, and radiation thermo-electric devices. Those radiation detectors suitable for use in methods or machines embodying this invention, are herein included in the term "photo-cells." Also, the radiations used are not confined to visible light rays but may be near infrared, near ultra-violet, and possibly soft X-rays and certain radiation from radioactive substances. Those radiations suitable for use in these machines are here included in the term "light."

It will be evident from the foregoing that the invention provides machines capable of handling a wide variety of work including small articles such as shoe patterns, and the various irregular surfaces and charts produced in scientific and research work, the areas of which must be determined with a high degree of accuracy. For all of these purposes the machines effect an important saving in labor, and produce more accurate results.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. In a machine for measuring the area of a surface of an article, a table for supporting the work, means revolving said table, means directing a scanning beam on the work so supported, additional means moving said beam with respect to the axis of said table in predetermined relationship to the rotation of the table to cause said beam to scan successive increments of area of said table and the work on it, means in the path of said beam responsive differentially to the interception and non-interception of said beam by said work, an electric circuit including said last-named means, and area-integrating means controlled by said circuit.

2. A machine according to claim 1, in which said means moving said beam feeds it a distance substantially equal to the width of the scanned path during each revolution of the table.

3. A machine according to claim 1, in which said means for moving said beam holds the beam stationary while the table makes a single revolution, then moves the beam radially a distance substantially equal to the width of the scanned path, holds it in the new position during the next revolution, and repeats these operations until the desired area has been scanned.

4. A machine according to claim 1, including means for reversing the travel of the scanning beam at the conclusion of the scanning operation in readiness to repeat said operation on another article of work.

5. A machine according to claim 1, in which the surface of said table is divided into relatively small units of alternating high and low reflecting power, and said scanning means cooperates with said responsive means and said circuit and said integrating means to effect integration either of the areas of those units covered or those not covered by the work.

6. A machine according to claim 1, including means indicating the integrated area.

7. A machine according to claim 1, in which the surface of said table is divided into relatively small units of known areas, and comprising alternating sections of relatively high and low reflecting power, said units being arranged in concentric circles, and in which said scanning means cooperates with said responsive means, said circuit and said integrating means, to cause the integrating means to integrate the areas of those units not covered by the work.

8. A machine according to claim 1, in which said table is made of transparent material and its work supporting surface is divided into relatively small opaque sections alternating with clear sections.

9. In a machine for measuring the surface area of a piece of work, means, including a source of a scanning beam, for scanning successive increments of said surface until said entire surface has been so scanned, means responsive to said beam mounted in position to receive the scanning beams when not intercepted by said work, an electric circuit including said last-named means, means controlled by said circuit for integrating the scanning increments, a casing for protecting parts of said machines from extraneous light, said casing including a movable cover, and interlocking means between the power supply and said cover for locking the cover closed while the scanning means is in operation.

10. In a machine for measuring the surface area of a piece of work, means, including a source of a scanning beam, for scanning successive increments of said surface until said entire surface has been so scanned, means responsive to said beam mounted in position to receive the scanning beams when not intercepted by said work, an electric circuit including said last-named means, means controlled by said circuit for integrating the scanning increments, a casing for protecting parts of said machines from extraneous light, said casing including a movable cover, and a device under the control of said cover for controlling the supply of current to certain of said means.

11. Apparatus according to claim 1, in which the scanning beam scans discrete area increments.

12. Apparatus according to claim 1, including means whereby said integrating means integrates regardless of the direction of travel of the work.

13. In area measuring apparatus, a rotatable work-receiving table, means forming a scanning beam intercepting the surface of said table, and means moving said last-named means so that, as said table rotates, said beam traces a spiral-type path thereon.

14. In area measuring apparatus, a rotatable work-receiving table, means forming a scanning beam intercepting the surface of said table, and means moving said last-named means so that, as said table rotates, said beam traces a continuous spiral-type path thereon.

15. In area measuring apparatus, a rotatable work-receiving table, means forming a scanning beam intercepting the surface of said table, and means moving said last-named means so that, as said table rotates, said beam traces a path on the table, the form of which is a series of concentric circles of progressively diminishing diameter.

16. In area measuring apparatus, a rotatable work-receiving table, means forming a scanning beam intercepting the surface of said table, and means moving said last-named means so that, as said table rotates, said beam traces a spiral-type path thereon, said table and said last-named means being interconnected by positive driving means.

17. In area measuring apparatus, a rotatable work-receiving table, means forming a scanning beam intercepting the surface of said table, and means moving said last-named means so that, as said table rotates, said beam traces a spiral-type path thereon, said last-named means causing said beam to trace a succession of concentric circular paths on said table.

18. In a machine for measuring the area of a surface, a power supply, means, including a source of a scanning beam, for scanning successive increments of said surface until the entire surface has been so scanned, means responsive to said beam mounted in position to receive the scanning beam when not intercepted by said surface, an electric circuit including said last-named means, means controlled by said circuit for integrating the scanned increments, a casing protecting parts of said machine from extraneous light, said casing including a movable cover, and interlocking means between said power supply and said cover for locking the cover closed while the scanning means is in operation.

19. In a machine for measuring the area of a surface, a power supply, means, including a source of a scanning beam, for scanning successive increments of said surface until the entire surface has been so scanned, means responsive to said beam mounted in position to receive the scanning beam when not intercepted by said surface, an electric circuit including said last-named means, means controlled by said circuit for integrating the scanned increments, a casing protecting parts of said machine from extraneous light, said casing including a movable cover, and a device under the control of said cover for controlling the application of power from said supply to certain of said means.

DONALD C. STOCKBARGER.
JOHN L. JONES.